| United States Patent [19] | [11] | 4,374,673 |
|---|---|---|
| Aldrich | [45] | Feb. 22, 1983 |

[54] STABLE DISPERSIONS OF FORTIFIED ROSIN

[75] Inventor: Paul H. Aldrich, London Britton Township, Chester County, Pa.

[73] Assignee: Hercules Incorporated, Wilmington, Del.

[21] Appl. No.: 221,760

[22] Filed: Dec. 31, 1980

[51] Int. Cl.$^3$ .............................................. C08L 93/04
[52] U.S. Cl. .................................... 106/212; 106/238
[58] Field of Search ................. 106/212, 238; 162/180

[56] References Cited

U.S. PATENT DOCUMENTS

| 2,628,918 | 2/1953 | Wilson | 106/238 |
|---|---|---|---|
| 2,684,300 | 7/1954 | Wilson | 106/238 |
| 3,070,452 | 12/1962 | Harris | 106/213 |
| 3,096,232 | 7/1963 | Chapman | 162/172 |
| 3,130,118 | 4/1964 | Chapman | 162/175 |
| 3,565,755 | 2/1971 | Davison | 162/168 |
| 3,966,654 | 6/1976 | Aldrich | 260/24 |
| 4,199,369 | 4/1980 | Hughes | 106/238 |
| 4,203,776 | 5/1980 | Greiner | 106/238 |

OTHER PUBLICATIONS

S. A. Radley, *Starch and its Derivatives,* Chapman & Hill Ltd., London (1969), pp. 385–387.

R. L. Whistler, *Starch: Chemistry & Technology,* Academic Press, New York, (1967), pp. 403–422.

*Primary Examiner*—Allan Lieberman
*Assistant Examiner*—Patricia Short

[57] ABSTRACT

Disclosed are novel aqueous dispersions which consist essentially of finely-divided fortified rosin particles; a water-soluble or water-dispersible cationic starch dispersing agent for the finely-divided fortified rosin particles; an anionic surface-active agent; and water. The novel aqueous dispersions are used to size paper.

9 Claims, No Drawings

STABLE DISPERSIONS OF FORTIFIED ROSIN

This invention relates to novel aqueous dispersions of fortified rosin. Particularly, this invention relates to aqueous dispersions which consist essentially of finely-divided fortified rosin particles, a water-soluble or water-dispersible cationic starch dispersing agent for the finely-divided fortified rosin particles, an anionic surface-active agent, and water. The cationic starch dispersing agent will be detailed more fully hereinafter. The novel fortified rosin dispersions of this invention are used to size paper.

U.S. Pat. No. 3,966,654 discloses aqueous fortified rosin dispersions consisting essentially of, by weight, (A) from about 5% to about 50% fortified rosin, (B) from about 0.5% to about 10% of water-soluble cationic resin dispersing agent, and (C) water to 100%. Dispersing agent (B) is selected from the group consisting of (i) a water-soluble aminopolyamide-epichlorohydrin resin, (ii) a water-soluble alkylenepolyamine-epichlorohydrin resin and (iii) a water-soluble poly(diallylamine)-epichlorohydrin resin. The fortified rosin is the adduct reaction product of rosin and an acidic compound containing the

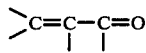

group. Also disclosed are methods of preparing the dispersions.

U.S. Pat. No. 3,966,654 also discloses prior art relating to aqueous fortified rosin dispersions. The disclosure of this patent, U.S. Pat. No. 3,966,654, is incorporated herein by reference.

U.S. Pat. Nos. 4,199,369 and 4,203,776 also disclose aqueous fortified rosin dispersions prepared by an inversion process. Prior art dispersions and methods of making the same are also disclosed. The disclosures of U.S. Pat. Nos. 4,199,369 and 4,203,776 are incorporated herein by reference.

U.S. Pat. Nos. 3,070,452 and 3,130,118 disclose the use of certain cationic starches in the preparation of aqueous ketene dimer emulsions. The emulsions are used to size paper.

Commercially available aqueous dispersions of fortified rosin particles for use in sizing paper cannot be stored for long periods of time because the fortified rosin particles tend to settle out on long standing and also have a tendency to agglomerate under conditions of agitation and shear such as those encountered in pumping the dispersions from their place of storage to their place of use.

The aqueous dispersions of this invention have excellent storage stability and are more resistant to particle agglomeration due to agitation and shear as encountered in pumping, for example.

In accordance with this invention there are provided aqueous dispersions of fortified rosin, adapted for use in the sizing of paper, which consist essentially of, by weight, (A) from about 5% to about 50% fortified rosin; (B) from about 0.5% to about 10% of at least one water-soluble or water-dispersible cationic starch dispersing agent; (C) from about 0.1% to 4% of at least one anionic surface active agent; and (D) water to 100%, said fortified rosin (A) being the adduct reaction product of rosin and an acidic compound containing the

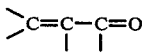

group.

In the preferred embodiment, the compositions described above will consist essentially of from about 10% to about 40% component (A); from about 1% to about 8% component (B); from about 0.2% to about 2% component (C); and (D) water to 100%.

Cationic starches used in this invention are starches to which amine groups have been attached by reaction of starch with compounds containing both amine groups and groups reactive with hydroxyl groups of the starch, the reaction involving formation of covalent bonds. Such modified starches are described in the books, *Starch Chemistry and Technology*, Vol. II Industrial Aspects, by Whistler and Paschall, Academic Press, N.Y. and London (1967), pages 403–422; and *Starch and Its Derivatives*, J. A. Radley, Fourth edition, Chapman and Hull, Ltd., London (1969), page 385 and ff.

A typical reaction is that of starch which has been treated with sodium hydroxide, with a compound of the formula:

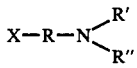

where X is halide such as chlorine or bromine; R is alkylene; and R' and R'' are each selected from the group consisting of alkyl, aryl or aralkyl.

Cationic starches of the above type will have the formula

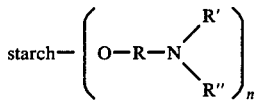

wherein R, R', and R'' are as above described, where n is the degree of substitution of the starch molecule. A specific example of such modified starch has the formula:

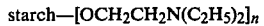

$$\text{starch}—[\text{OCH}_2\text{CH}_2\text{N}(\text{C}_2\text{H}_5)_2]_n$$

where n is the degree of substitution of the starch molecule.

Another modified starch suitable for use in this invention has the formula:

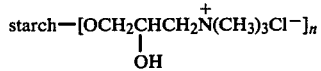

Another modified starch suitable for use in this invention is prepared by reaction of starch with ethyleneimine. Such modified starch has the formula:

$$\text{starch}—(\text{OCH}_2\text{CH}_2\text{NH}_2)_n$$

The degree of substitution, D.S., (n in the above formulas) of a starch molecule is the average number of hydroxyl groups in the anhydroglucose units of the starch molecule which are substituted by reaction with a compound containing both amine groups and groups reactive with the hydroxyl groups of the starch. The cationic starches used in this invention will have a degree of substitution of from about 0.02 to about 0.05.

The fortified rosin can be extended if desired by known extenders therefor such as waxes (particularly paraffin wax and microcrystalline wax); hydrocarbon resins including those derived from petroleum hydrocarbons and terpenes; and the like. This is accomplished by melt blending or solution blending with the fortified rosin from about 10% to about 100% by weight, based on the weight of fortified rosin, of the fortified rosin extender.

Also blends of fortified rosin and rosin; and blends of fortified rosin, rosin and rosin extender can be used.

Fortified rosin-rosin blends will comprise about 25% to 95% fortified rosin and about 75% to 5% rosin. Blends of fortified rosin, rosin, and rosin extender will comprise about 25% to 45% fortified rosin, about 5% to 50% rosin, and about 5% to 50% rosin extender.

The aqueous fortified rosin dispersions of this invention can be prepared by homogenizing a solution or a melt of the fortified rosin or by the so-called inversion process.

In preparing the aqueous fortified rosin dispersions of this invention by the solution process, the fortified rosin (including the extender or rosin or both if either or both are employed) is first dissolved in a water-immiscible organic solvent therefor such, for example, as benzene, xylene, methylene chloride, chloroform, or 1,2-dichloropropane. Mixtures of two or more solvents can be used if desired. The selected solvent will also be non-reactive with the components of the aqueous dispersion to be subsequently prepared.

An emulsion is prepared which is comprised of the organic solvent-fortified rosin solution as the dispersed phase and, as the continuous phase, an aqueous solution of cationic starch dispersing agent and anionic surface active agent. The essentially unstable aqueous emulsion is then subjected to extreme shear to provide an essentially stable emulsion. Extreme shear is conveniently accomplished by means of an homogenizer. Thus, passing, at least once, the unstable aqueous emulsion through an homogenizer under a pressure on the order of from about 1000 p.s.i.g. to about 8000 p.s.i.g., will provide an essentially stable emulsion. Subsequently, the organic solvent component of the emulsion is removed from the emulsion, as by vacuum distillation, and there is provided an essentially stable aqueous dispersion of fortified rosin particles. These procedural steps are described in U.S. Pat. No. 3,565,755, the disclosure of which is hereby incorporated by reference.

In preparing dispersions of this invention by the melt process, the fortified rosin is heated, under pressure if required, in admixture with an aqueous solution of cationic starch dispersing agent and anionic surface active agent. The unstable aqueous dispersion is heated to a temperature of from about 80° C. to about 195° C. Agitation thereof during the time required to reach the necessary temperature is recommended. The heated dispersion is then subjected to extreme shear, whereby there is provided an essentially stable aqueous dispersion. Extreme shear is conveniently accomplished by means of an homogenizer. Thus, passing, at least once, the heated mixture through an homogenizer under a pressure on the order of about 2000 p.s.i.g. to about 8000 p.s.i.g. will provide an essentially stable dispersion. The pressure selected is within the skill of the art.

The aqueous fortified rosin dispersions of this invention can also be prepared by an inversion process. The fortified rosin is admixed with an aqueous solution of cationic starch dispersing agent and anionic surface active agent in an amount to provide a water-in-oil emulsion which is subsequently inverted to a oil-in-water emulsion by the rapid addition of water with vigorous stirring.

ROSIN

The rosin used to prepare the fortified rosin employed in this invention can be any of the commercially available types of rosin, such as wood rosin, gum rosin, tall oil rosin, and mixtures of any two or more, in their crude or refined state. Partially hydrogenated rosins and polymerized rosins, as well as rosins that have been treated to inhibit crystallization such as by heat treatment or reaction with formaldehyde, can be employed.

The fortified rosin employed is the adduct reaction product of rosin and an acidic compound containing the

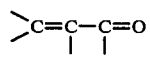

group and is derived by reacting rosin and the acidic compound at elevated temperatures of from about 150° C. to about 210° C.

The amount of acidic compound employed will be that amount which will provide fortified rosin containing from about 1% to about 12% by weight of adducted acidic compound based on the weight of the fortified rosin. Methods of preparing fortified rosin are disclosed and described in U.S. Pat. Nos. 2,628,918 and 2,684,300, reference to which is hereby made.

Examples of acidic compounds containing the

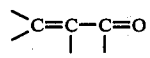

group that can be used to prepare the fortified rosin include the alpha-beta-unsaturated organic acids and their available anhydrides, specific examples of which include fumaric acid, maleic acid, acrylic acid, maleic anhydride, itaconic acid, itaconic anhydride, citraconic acid and citraconic anhydride. Mixtures of acids can be used to prepare the fortified rosin if desired. Thus, for example, a mixture of the acrylic acid adduct of rosin and the fumaric acid adduct can be used to prepare the novel dispersions of this invention. Also, fortified rosin that has been substantially completely hydrogenated after adduct formation can be used.

If rosin (that is, unfortified rosin) is used in combination with fortified rosin, it can be any of the commercially available types of rosin, such as wood rosin, gum rosin, tall oil rosin, and mixtures of any two or more, in their crude or refined state. Partially or substantially completely hydrogenated rosins and polymerized rosins, as well as rosin that have been treated to inhibit crystallization such as by heat treatment or reaction with formaldehyde, can be employed.

ANIONIC SURFACE ACTIVE AGENTS

As above set forth, one of the essential components of the composition of this invention is an anionic surface active agent. Anionic surface active agents are well known in the art. In carrying out this invention the preferred anionic surface active agent is a soap, such as the sodium soap, of a rosin-base material of which the dispersion is comprised. Other suitable anionic dispersing agents include salts of alkylaryl sulfonic acids, salts of condensed naphthalene sulfonic acids, salts of dialkyl esters of sulfosuccinic acid, salts of alkyl half esters of sulfuric acid, and salts of alkylphenoxy-(polyethyleneoxy)ethanol half esters of sulfuric acid.

The rosin soap can be prepared separately and added to the composition or it can be formed in situ by addition of a base, such as sodium hydroxide, potassium hydroxide or ammonium hydroxide to the composition of which the fortified rosin is comprised. Sodium soap of fortified rosin is the preferred anionic surface active agent and it is preferred that it be formed in situ by addition of sodium hydroxide. This is exemplified in the working examples.

In the case of the alkyl aryl sulfonates, the alkyl group may be linear or branched with ten to eighteen carbon atoms. Various mixtures of these alkylaryl sulfonates can be used. The preferred aryl group is phenyl. Sodium alkylbenzene sulfonates are available commercially. One commercially available product is Ultrawet DS. Ultrawet is a trademark of Arco Chemical Company. Condensed naphthalene sulfonic acid salts are products prepared by condensing formaldehyde with naphthylene followed by sulfonation with sulfuric acid and are available commercially. Commercially available products are Tamol SN. and Stepantan A. Tamol is a trademark of Rohm & Haas Company and Stepantan is a trademark of Stepan Chemical Co.

In the case of the salts of dialkyl esters of sulfosuccinic acids, the alkyl groups will include cyclohexyl, hexyl, isobutyl, octyl, pentyl and tridecyl. In the case of the salts of half alkyl esters of sulfuric acid, the alkyl group may have ten to eighteen carbon atoms. In the case of the salts of alkylphenoxy(polyethyleneoxy)ethanol half esters of sulfuric acid, the preferred alkyl group is the nonyl group obtained in propylene trimerization. The polyoxyethylene content can average from one to twenty moles per mole, but an average of four to twelve is preferred.

The cationic starch is cooked prior to its use. Cooking may be by methods well known in the art.

The fortified rosin dispersions of this invention have outstanding stability. When commercially available high free fortified rosin dispersions are allowed to stand undisturbed in a container, there is a tendency for the fortified rosin particles to agglomerate and settle to the bottom where further agglomeration can cause a hard layer of fortified rosin particles to form. This problem can be particularly severe if storage is at elevated temperature (35°-45° C.) such as can be found in some paper mills. There is very little agglomeration and settling in the dispersions of this invention. When settling does occur because some of the particles are too large to remain suspended by Brownian motion, the particles are easily redispersed with gentle agitation.

The dispersions of this invention also have high shear stability. When commercially available high free fortified rosin dispersions are pumped through screens to remove particles formed by surface drying or other agglomeration, there is a tendency for the screens to fill, not so much with these large particles, but by buildup of fortified rosin particles due to the shear forces on the screen wires. This problem can be very severe at 35° C. to 40° C. The dispersions of this invention resist this kind of shear degradation.

EXAMPLE 1

120 grams of cationic waxy maize starch and 1000 grams distilled water were placed in a flask. The pH of the mixture was adjusted to 4 with sulfuric acid and then heated to 95°-100° C., with stirring, for about 30 minutes and then cooled to room temperature (about 23° C.) and adjusted to 1200 grams total weight with distilled water (8.8% total solids). The cationic starch used was Stalok 140 cationic starch available from Staley Manufacturing Company, Inc. and the modifying substituent is

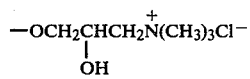

at a level to provide 0.3% nitrogen in the product. The degree of substitution is 0.04.

570 grams of fumaric acid fortified formaldehyde treated tall oil rosin having an acid number of 216 (about 6.8% combined fumaric acid) was dissolved in 380 grams methylene chloride with agitation. 1145 grams of the above prepared starch solution was mixed with 38 grams of a 4% aqueous solution of NaOH and then added to the fortified rosin solution to provide a mixture which was stirred for 1 minute and then homogenized 2 times at 3000 p.s.i.g. in a 15 gallon per hour Manton-Gaulin homogenizer.

The resulting emulsion was stripped, under vacuum, to remove methylene chloride and to provide an aqueous dispersion of fortified rosin containing cationic starch dispersing agent and anionic surface active agent (the sodium soap of the fortified rosin), which was formed in situ. Very little material precipitated during stripping. The resulting aqueous dispersion had a solids content of 37.6%.

EXAMPLE 2

Example 1 was repeated four times to provide aqueous dispersions. These dispersions were combined with the Example 1 dispersion and the resulting dispersion adjusted to 35% total solids by addition of distilled water. This dispersion had a viscosity of 352 centipoises. 80% of the dispersed particles had a particle size of less than 0.4 micron as measured by a Coulter Counter apparatus for determining particle size.

EXAMPLE 3

The dispersion of Example 2 was diluted to about 3% solids with demineralized water and used to size paper. Size (0.44% size solids on dry pulp) was added to 50:50 bleached kraft hardwood-bleached kraft softwood pulp containing 2.5% alum. Right after size addition, pH was 4.4-4.5. Five paper handsheets (40 lbs./3000 sq. ft.) were prepared from the size-pulp mixture on a Nobel and Wood handsheet machine. Size properties were determined on these five handsheets using Hercules sizing tester employing No. 2 test solution. The test result is the average of the five separate tests and indicates good sizing.

| Example | Hercules Sizing Test, Seconds (average of 5 separate tests) |
|---|---|
| 2 | 130 |

EXAMPLE 4

150 grams of cationic waxy maize starch and 1300 grams distilled water were placed in a flask. The pH of the mixture was adjusted to 4 with sulfuric acid and then heated to 95°–100° C., with stirring, for about 30 minutes and then cooled to room temperature (about 23° C.) and adjusted to 1500 grams total weight with distilled water (8.8% total solids). The cationic starch used with ARD 2187 cationic starch available from American Maize Products Company, Inc. and the modifying substituent is

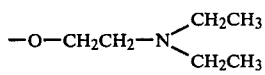

at a level to provide 0.3% nitrogen in the product. The degree of substitution is 0.04.

750 grams of fumaric acid fortified formaldehyde treated tall oil rosin having an acid number of 217 (about 7.1% combined fumaric acid) was dissolved in 500 grams methylene chloride with agitation. The above prepared starch solution was mixed with 38 grams of a 4% aqueous solution of NaOH and then added to the fortified rosin solution to provide a mixture which was stirred for 1 minute and then homogenized 2 times at 3000 p.s.i.g. in a 15 gallon per hour Manton-Gaulin homogenizer.

The resulting emulsion was stripped, under vacuum, to remove methylene chloride and to provide an aqueous dispersion of fortified rosin containing cationic starch dispersing agent and anionic surface active agent (the sodium soap of the fortified rosin), which was formed in situ. Very little material precipitated during stripping.

EXAMPLE 5

Example 4 was repeated nine times to provide aqueous dispersions. These dispersions were combined with the Example 4 dispersion to provide a dispersion of 37.8% total solids. This dispersion had a viscosity of 98 centipoises. 60% of the dispersed particles had a particle size of less than 0.4 micron as measured by a Coulter Counter apparatus for determining particle size.

EXAMPLE 6

The dispersion of Example 5 was diluted to about 3% solids with demineralized water and used for sizing a 40 lb./3000 sq. ft. sheet of 50% bleached kraft hardwood pulp and 50% bleached kraft softwood pulp refined to 500 Canadian Standard Freeness and containing 10% clay pigment (Huber SWS Clay). Sizing was carried out with 0.2% size solids (based on pulp dry weight) at tray pH 4.5 using 1.25% alum and 0.025% anionic retention aid (Reten 421 anionic resin; an acrylic acid-acrylamide copolymer). The finished sheet was tested with No. 2 test solution on the Hercules sizing tester. The test time was 317 seconds showing good sizing.

EXAMPLE 7

227 grams of cationic potato starch and 3100 grams distilled water were placed in a flask. The mixture was heated to 90°–100° C., with stirring, for about 30 minutes and then cooled to room temperature (about 23° C.) and adjusted to 3400 grams total weight with distilled water (8.8% total solids). The cationic starch used was Stalok 400 cationic starch available from Staley Manufacturing Company, Inc. and the modifying substituent is

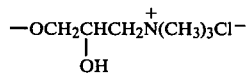

at a level to provide 0.3% nitrogen in the product. The degree of substitution is 0.04.

400 grams of fumaric acid fortified formaldehyde treated tall oil rosin having an acid number of 211 (about 7.1% combined fumaric acid) was dissolved in 280 grams methylene chloride with agitation to provide a solution. To this solution were added 992 grams of the above prepared starch solution and 27 grams of a 4% aqueous solution of NaOH to provide a mixture which was stirred for 1 minute and then homogenized 2 times at 3000 p.s.i.g. in a 15 gallon per hour Manton-Gaulin homogenizer.

The resulting emulsion was stripped, under vacuum, to remove methylene chloride and to provide an aqueous dispersion of fortified rosin containing cationic starch dispersing agent and anionic surface active agent (the sodium soap of the fortified rosin), which was formed in situ. The resulting aqueous dispersion had a solids content of 27.2%. The average particle size of the dispersed particles, as determined by the Nano-Sizer apparatus for determining particle size, was 1.6 microns.

EXAMPLE 8

360 grams of cationic cornstarch and 4000 grams distilled water were placed in a flask, heated to 95°–100° C., with stirring, for about 30 minutes and then cooled to room temperature (about 23° C.) and adjusted to a solids content of 7.1% with distilled water. The resulting mixture was homogenized two times at 8000 p.s.i.g. and 70° C. in a 15 gallon per hour Manton-Gaulin homogenizer. The resulting product was a very soft gel as compared to the unhomogenized product which was a relatively firm gel. Due to water loss from homogenizing the hot (70° C.) solution, total solids increased to 7.3%. The cationic starch used was Stalok 300 cationic cornstarch available from Staley Manufacturing Company, Inc. and the modifying substituent is

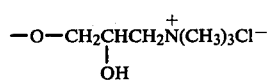

at a level to provide 0.3% nitrogen in the product. The degree of substitution is 0.04.

400 grams of fumaric acid fortified formaldehyde treated tall oil rosin having an acid number of 211 (about 7.4% combined fumaric acid) was dissolved in 280 grams methylene chloride with agitation. To this solution was added 1997 grams of the above prepared starch solution and 27 grams of a 4% aqueous solution of NaOH to provide a mixture which was stirred for 1 minute and then homogenized 2 times at 3000 p.s.i.g. in a 15 gallon per hour Manton-Gaulin homogenizer.

The resulting emulsion was stripped, under vacuum, to remove methylene chloride and to provide an aqueous dispersion of fortified rosin containing cationic starch dispersing agent and anionic surface active agent (the sodium soap of the fortified rosin), which was formed in situ. The resulting aqueous dispersion had a solids content of 14.9% and a viscosity of 4100 centipoises. The average particle size of the dispersed particles, as determined by the Nano-Sizer apparatus, was 1.2 microns.

EXAMPLE 9

240 grams of cationic cornstarch and 2000 grams distilled water were placed in a flask. The pH of the mixture was adjusted to 4 with sulfuric acid and then heated to 95°–100° C., with stirring, for about 30 minutes and then cooled to room temperature (about 23° C.) and adjusted to a 2400 grams total weight with distilled water (8.8% total solids). The cationic starch used was Stalok 140 cationic starch as used in Example 1.

750 grams of fumaric acid fortified formaldehyde treated tall oil rosin having an acid number of 214 (about 7.0% combined fumaric acid) was dissolved in 500 grams methylene chloride with agitation. 1500 grams of the above prepared starch solution was blended with 7.8 grams of a 58% aqueous solution of Alipal CO436 anionic surface active agent and then added to the fortified rosin solution to provide a mixture which was stirred for 1 minute and then homogenized 2 times at 4000 p.s.i.g. in a 15 gallon per hour Manton-Gaulin homogenizer. Alipal CO436 is the ammonium salt of sulfate ester of four mole ethylene oxide adduct of nonylphenol. Alipal is a trademark of GAF Corporation.

The resulting emulsion was stripped, under vacuum, to remove methylene chloride and to provide an aqueous dispersion of fortified rosin containing cationic starch dispersing agent and anionic surface active agent. Very little material precipitated during stripping. The resulting aqueous dispersion had a solids content of 37.6% and a viscosity of 566 centipoises. 87% of the dispersed particles had a particle size of less than 0.4 micron as measured by the Coulter Counter apparatus.

EXAMPLE 10

Example 9 was repeated with the exception that 19.7 grams of 23% aqueous solution of Siponate DS4 anionic surface active agent was used in place of Alipal CO 436 anionic surface active agent and the cationic starch used in Example 4 was used in place of Stalok 140 cationic starch. The resulting dispersion had a solids content of 39.1% and a viscosity of 180 centipoises. 66% of the dispersed particles had a particle size of less than 0.4 micron as measured by the Coulter Counter apparatus. Siponate DS4 is sodium dodecylbenzene sulfonate. Siponate is a trademark of Alcolac, Inc.

EXAMPLE 11

Example 10 was repeated with the exception that 15.6 grams of 30% aqueous solution of Duponol WAQE anionic surface active agent was used in place of Siponate DS4 anionic surface active agent. The resulting dispersion had a solids content of 39.1% and a viscosity of 80 centipoises. Duponol is sodium lauryl sulfate. Duponol is a trademark of E. I. du Pont de Nemours & Co.

EXAMPLE 12

Example 10 was repeated with the exception that 12.9 grams of 30% aqueous solution of Aerosol A103 anionic surface active agent was used in place of Alipal CO436 anionic surface active agent. The resulting dispersion had a solids content of 38.7% and a viscosity of 71 centipoises. Aerosol A103 is the disodium salt of sulfosuccinic Acid half ester of the ethylene oxide adduct of nonylphenol. Aerosol is a trademark of American Cyanamid Company.

The above description and examples are illustrative of the invention and not in limitation thereof.

What I claim and desire to protect by Letters Patent is:

1. An aqueous dispersion of fortified rosin consisting essentially of, by weight, (A) from about 5% to about 50% fortified rosin; (B) from about 0.5% to about 10% of at least one water-soluble or water-dispersible cationic starch dispersing agent; (C) from about 0.1% to 4% of at least one anionic surface active agent; and (D) water to 100%, component (B) being selected from (I) a cationic starch having the formula

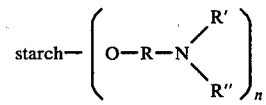

wherein R is alkylene, R' and R" are each selected from the group consisting of alkyl, aryl, and aralkyl and n is from about 0.02 to about 0.05,

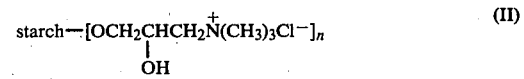

wherein n is as above defined, and (III) starch—$(OCH_2CH_2NH_2)_n$ where n is above defined, said fortified rosin (A) being the adduct reaction product of rosin and an acidic compound containing the

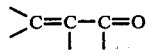

group.

2. An aqueous dispersion of fortified rosin consisting essentially of, by weight, (A) from about 10% to about 40% fortified rosin; (B) from about 1% to about 8% of at least one water-soluble or water-dispersible cationic starch dispersing agent; (C) from about 0.2% to 2% of at least one anionic surface active agent; and (D) water to 100%, component (B) being selected from (I) a cationic starch having the formula

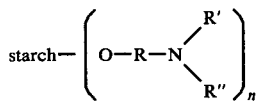

wherein R is alkylene, R' and R" are each selected from the group consisting of alkyl, aryl, and aralkyl and n is from about 0.02 to about 0.05,

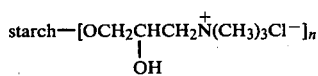 (II)

wherein n is as above defined, and (III) starch—$(OCH_2CH_2NH_2)_n$ where n is above defined, said fortified rosin (A) being the adduct reaction product of rosin and an acidic compound containing the

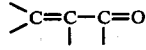

group.

3. An aqueous dispersion of fortified rosin consisting essentially of, by weight, (A) from about 10% to about 40% fortified rosin; (B) from about 1% to about 8% of at least one water-soluble or water-dispersible cationic starch dispersing agent; (C) from about 0.2% to 2% of at least one anionic surface active agent; and (D) water to 100%, component (B) being selected from a cationic starch having the formula

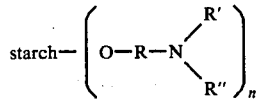

wherein R is alkylene, R' and R" are each selected from the group consisting of alkyl, aryl, and aralkyl and n is from about 0.02 to about 0.05, said fortified rosin (A) being the adduct reaction product of rosin and an acidic compound containing the

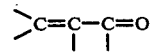

group.

4. An aqueous dispersion of fortified rosin consisting essentially of, by weight, (A) from about 10% to about 40% fortified rosin; (B) from about 1% to about 8% of at least one water-soluble or water-dispersible cationic starch dispersing agent; (C) from about 0.2% to 2% of at least one anionic surface active agent; and (D) water to 100%, component (B) being starch—$[OCH_2CH_2N(C_2H_5)_2]_n$ wherein n is from about 0.02 to about 0.05, said fortified rosin (A) being the adduct reaction product of rosin and an acidic compound containing the

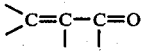

group.

5. An aqueous dispersion of fortified rosin consisting essentially of, by weight, (A) from about 10% to about 40% fortified rosin; (B) from about 1% to about 8% of at least one water-soluble or water-dispersible cationic starch dispersing agent; (C) from about 0.2% to 2% of at least one anionic surface active agent; and (D) water to 100%, component (B) being

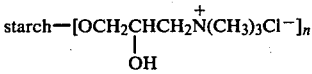

wherein n is from about 0.02 to about 0.05, said fortified rosin (A) being the adduct reaction product of rosin and an acidic compound containing the

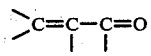

group.

6. An aqueous dispersion of fortified rosin consisting essentially of, by weight, (A) from about 10% to about 40% fortified rosin; (B) from about 1% to about 8% of at least one water-soluble or water-dispersible cationic starch dispersing agent; (C) from about 0.2% to 2% of at least one anionic surface active agent; and (D) water to 100%, component (B) being starch—$(OCH_2CH_2NH_2)_n$ where n is from about 0.02 to about 0.05, said fortified rosin (A) being the adduct reaction product of rosin and an acidic compound containing the

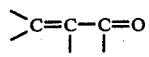

group.

7. Any one of the dispersions of claims 1-6 wherein the fortified rosin is extended with a fortified rosin extender in an amount of from about 10% to 100% by weight based on the weight of fortified rosin.

8. Any one of the dispersions of claims 1-6 wherein the fortified rosin has blended therewith unfortified rosin to provide a blend of about 25% to about 95% fortified rosin and about 75% to about 5% unfortified rosin.

9. Any one of the dispersions of claims 1-6 wherein the fortified rosin has blended therewith unfortified rosin and rosin extender to provide a blend of about 25% to about 45% fortified rosin, about 5% to about 50% unfortified rosin, and about 5% to about 50% rosin extender.

* * * * *